US006337658B1

(12) United States Patent
Tong et al.

(10) Patent No.: US 6,337,658 B1
(45) Date of Patent: Jan. 8, 2002

(54) TRANSMIT ANTENNA ALIGNMENT PEAK SEARCH METHOD AND APPARATUS

(75) Inventors: Weiping Tong, Nepean; Claude Dupuis, Ottawa; Ning Guo, Nepean, all of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/450,783

(22) Filed: Nov. 30, 1999

(51) Int. Cl.$^7$ .......................... H01Q 3/00; H04B 17/00
(52) U.S. Cl. ................. 342/359; 455/67.4; 455/67.5; 455/70
(58) Field of Search ................. 342/359, 422, 342/174, 173; 455/70, 67.5, 13.4, 67.4, 562, 9

(56) References Cited

U.S. PATENT DOCUMENTS

| | | | | | |
|---|---|---|---|---|---|
| 3,378,845 A | * | 4/1968 | Welber | ................. | 342/352 |
| 3,772,701 A | * | 11/1973 | Wilkinson | ................. | 342/359 |
| 4,038,600 A | * | 7/1977 | Thomas | ................. | 348/180 |
| 4,630,058 A | * | 12/1986 | Brown | ................. | 342/359 |
| 4,801,940 A | * | 1/1989 | Ma et al. | ................. | 342/359 |

* cited by examiner

Primary Examiner—Gregory C. Issing

(57) ABSTRACT

An antenna alignment method for example for application to transmit/receive band satellite ground terminals, and a peak search tool for the realization of this method. In the method, from the antenna, a test signal is transmitted over an uplink channel to the satellite. Over a downlink channel from the satellite is received a sequence of alignment accuracy indications for the test signal. On the basis of the sequence of alignment accuracy indications, adjustments to the antenna's orientation for the alignment parameter are made. The peak search tool has an input adapted to receive a sequence of alignment accuracy indications each somehow indicative of alignment accuracy, a maximum alignment accuracy indication finder functional entity adapted to identify when a best alignment accuracy indication has been received in the sequence of alignment accuracy indications, a direction finder functional entity adapted to make a determination from the sequence of alignment accuracy indications whether a most recent adjustment step made by the installer has resulted in an improvement or degradation, and an indicator adapted to indicate to the installer the determination made by the direction finder functional entity.

24 Claims, 9 Drawing Sheets

TRANSMIT ANTENNA ALIGNMENT PEAK SEARCH METHOD AND APPARATUS

FIELD OF THE INVENTION

The invention relates to systems and methods for aligning a transmit antenna with a remote receiver, for example for aligning a ground terminal antenna with a satellite.

BACKGROUND OF THE INVENTION

In any satellite communication system, aligning the antenna of a ground terminal to the satellite is a prerequisite to allow the system to operate normally. In C-band and Ku band satellite communications systems in which only downlink transmissions to user ground terminals occur, the dish antenna at the ground terminal can be aligned with the satellite by monitoring received signal strengths and frequency spectra to find the boresight direction of the dish antenna. The sensitivity of the received signal strength to the pointing accuracy is quite low such that a substantial pointing error will not substantially effect the strength of the signal captured. Because of this, accurate systems and methods for aligning the antenna in such satellite communications systems have not been required.

In bi-directional satellite communications systems in which transmissions occur on both the downlink and the uplink, the problem of aligning the antenna of a ground station to optimize signal capture at both the ground terminal and the satellite is a special issue compared with the above-discussed systems employing only downlink communications. This is because in bi-directional systems, typically transmissions are made on different frequencies and/or different bands for the uplink vs. the downlink. For example, uplink transmissions may be done on the Ka band while downlink transmissions may be done on the Ku band.

Generally, a satellite terminal has some sort of antenna tracking system which utilizes an alignment approach. The resolution of conventional alignment approaches will limit the pointing accuracy around 0.5 dB for the receiving signal. However, due to the difference of the antenna beamwidth between the Ku band and Ka band, a 0.5 dB pointing loss existing in the Ku band (downlink) will result in a loss of up to 3.4 dB in the Ka band signals transmitted on the uplink. Therefore, this traditional approach to antenna alignment (also called open loop alignment) cannot provide enough pointing accuracy for the uplink in such a system.

More specifically, this almost 3 dB of additional loss means the ground terminal must double its power to reach the satellite. The additional transmitted power not only wastes the ground terminal's power, increases the system cost, reduces the system margin and degrades the equipment reliability, but also increases the interference to other satellite systems, which results in a difficulty in cooperating with them.

It would be advantageous to have an alignment system and method which facilitates more accurate alignment of the ground terminal antenna such that the loss due to pointing accuracy could be substantially reduced compared to that of traditional methods.

SUMMARY OF THE INVENTION

Embodiments of the invention propose a novel antenna alignment mechanism for the Ka/Ku band satellite ground terminal, and provide a preferred design of a peak search tool for the realization of this method. A key advantage of this invention is the reduction of the antenna uplink pointing loss, even up to 3 dB. Based on this potential 3 dB savings in ground terminal transmitting power provided by the invention, the cost of equipment can be substantially reduced. In systems with many thousands of ground terminals, the total savings may become very significant.

In the preferred embodiment, either a 3 dB margin can be obtained, or the system availability can be improved from 99.5% to 99.7%. This invention can be used in any frequency band satellite systems, e.g. c, Ku, Ka bands, etc. and more generally in satellite systems having different up/down frequency combination links.

In one broad aspect, the invention provides a method of aligning an antenna with a satellite for an alignment parameter. From the antenna, a test signal is transmitted over an uplink channel to the satellite. Over a downlink channel from the satellite is received a sequence of alignment accuracy indications for the test signal. On the basis of the sequence of alignment accuracy indications, adjustments to the antenna's orientation for the alignment parameter are made.

Preferably, the alignment accuracy indications are processed to give an indication of whether a previous adjustment resulted in an improvement or a degradation in pointing accuracy. This processing might for example consist of determining if the received alignment accuracy indications have become stable, detecting if a non-trivial change in the quality since the adjustment has occurred, detecting if there is an improvement in the received alignment accuracy indications, and determining if a maximum alignment accuracy indication has been received. If the received alignment accuracy indications have become stable, a non-trivial change has been detected, an improvement in the received alignment accuracy indications has been detected, an indication is output indicating that the previous adjustment was a good one. Alternatively, if the received alignment accuracy indications have become stable, a non-trivial change has been detected, an improvement in the received alignment accuracy indications has not been detected, an indication is output indicating that the previous adjustment was a bad one. Finally, if the received alignment accuracy indications have become stable, and the maximum alignment accuracy indication has been received, an indication is output indicating that the method for the parameter is complete.

Typically, the uplink signals are sent from the antenna to a satellite which retransmits them to a hub ground station which generates the alignment accuracy indications and transmits these to the satellite which retransmits them to the antenna.

While the alignment accuracy indication is preferably some measure of signal strength such as signal-to-noise ratio or absolute signal strength, any suitable alignment accuracy indication may be used.

To determine when the method is complete for a given parameter, a maximum in the alignment accuracy indications is preferably detected by determining when a sequence of the adjustments have been made which resulted in an oscillation in the antenna's orientation about a common position.

Preferably, a "RIGHT" or "WRONG" indication is generated after each adjustment to the antenna orientation, wherein "RIGHT" indicates that the previous adjustment resulted in an improvement in pointing accuracy and that another adjustment in the same direction should be made, and "wrong" indicates that the previous adjustment resulted in a degradation in pointing accuracy and that an adjustment in the opposite direction should be made.

In another embodiment, a peak searcher apparatus is provided which is adapted to facilitate aligning an antenna with a satellite for an alignment parameter by coordinating antenna adjustment steps made by an installer. The apparatus has an input adapted to receive a sequence of alignment accuracy indications each somehow indicative of alignment accuracy, a maximum alignment accuracy indication finder functional entity adapted to identify when a maximum alignment accuracy indication has been received in the sequence of alignment accuracy indications, a direction finder functional entity adapted to make a determination from the sequence of alignment accuracy indications whether a most recent adjustment step made by the installer has resulted in an improvement or degradation, and an indicator adapted to indicate to the installer the determination made by the direction finder functional entity.

The peak searcher is preferably adapted for use with or in combination with a ground terminal which generates a test signal, transmits the test signal through the satellite to a remote receiver, receives alignment accuracy indications made by the remote receiver on the basis of the test signal, and passes these alignment accuracy indications to the peak searcher apparatus.

The direction finder functional entity is preferably further operable to identify predetermined patterns in a most recent sequence of the determinations which are defined to indicate no further adjustments are required. For example, it might have a memory for storing the most recent sequence of the determinations, and logic for identifying the predetermined patterns.

More generally, an embodiment of the invention provides an alignment procedure for aligning any antenna with any remote receiver for an alignment parameter. The method involves transmitting from the antenna a test signal over a transmit channel to the remote receiver, receiving a sequence of alignment accuracy indications for the test signal, and making a plurality of adjustments to the antenna's orientation for the alignment parameter on the basis of the sequence of alignment accuracy indications.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
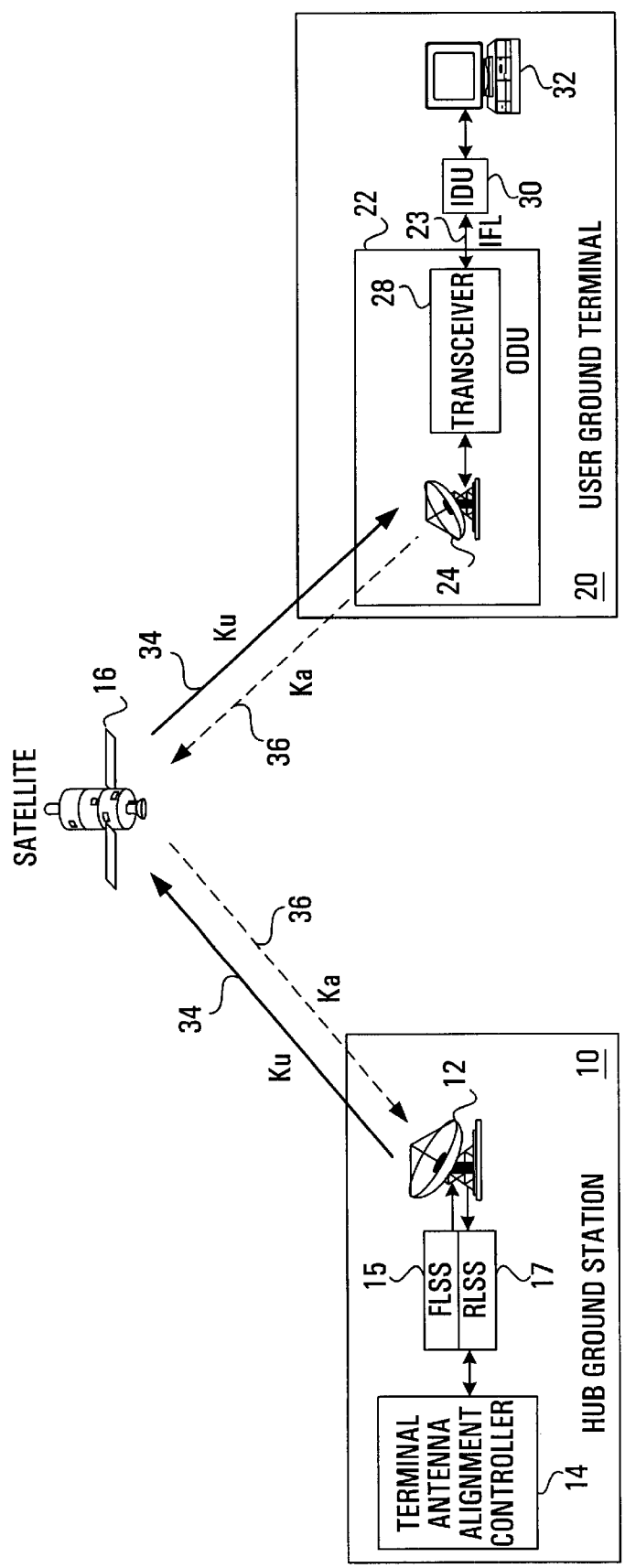
FIG. 1 is an example of a bi-directional satellite communications system.

Referring firstly to FIG. 1, an example of a bi-directional satellite communications system provided by an embodiment of the invention is shown to include a hub ground station 10 including a hub dish 12 connected to a terminal antenna alignment controller 14 through a FLSS (forward link subsystem) 15, and a RLSS (reverse link subsystem) 17. The hub dish 12 is permanently aligned with a satellite 16 for the purpose of this description. Also shown is a single user ground terminal 20 which consists of an ODU (outdoor unit) 22 consisting of a dish antenna 24 connected to a transceiver 28, which is in turn connected through IFL (Inter-Facility Link) 23 to an IDU (indoor unit) 30 which may be connected to other equipment in the user premises of the IDU 30 such as a computer 32. In the illustrated example, it is assumed that transmissions 34 from the hub ground station 10 to the user ground terminal 20 via the satellite 16 are on the Ku band and that transmissions 36 from the user ground terminal 20 to the hub ground station 10 via the satellite 16 are on the Ka band. Typically there will be a large number of user ground terminals, and each time a new user ground terminal is to be setup, the user ground terminal's dish antenna must be aligned to provide proper pointing accuracy.

The approximate loss due to a pointing inaccuracy of dA degrees for a dish having a diameter D (meters) for transmissions at a frequency "f" (GHz) may be computed using the following equation (see for example G. Maral, Satellite Communications Systems, 1998):

$$L(dB)=3\times[2\times dA/(21/(f\times D))]2$$

By way of example, for a pointing inaccuracy of 0.38 degrees with a one meter diameter antenna, the loss due to pointing inaccuracy for Ku band frequencies at 11.4 GHz is 0.5 dB. The loss for the same pointing inaccuracy for Ka band frequencies at 29.5 GHz is 3.4 dB, almost 3 dB greater.

Figure 2:
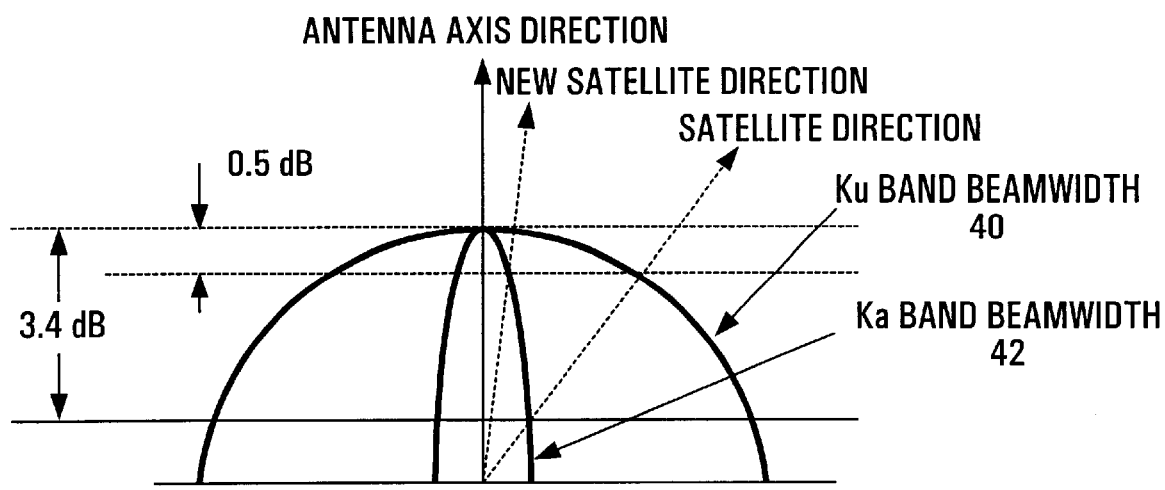
FIG. 2 is a plot of loss due to pointing inaccuracy for both the Ku band and the Ka band.

FIG. 2 is a plot of the loss due to pointing inaccuracy for both the Ku band (curve 40) and the Ka band (curve 42) for the above exemplified parameters. It is immediately clear that the Ka band beamwidth is much narrower than the Ku band beamwidth.

An embodiment of the invention provides a closed loop alignment solution. Instead of performing antenna alignment based on the received Ku signal, the user ground terminal 20 assesses the performance of a current alignment based on a signal sent to the hub ground station 10 on the transmitted Ka signal 36. The terminal antenna alignment controller 14 in the hub ground station 10 generates an alignment accuracy indication (which is assumed to be a SNR measurement (signal-to-noise ratio) i.e. Eb/No for this example) on the signal received from the user ground terminal 20 on the Ka signal 36 and sends this measurement back to the user ground terminal 20 through a message on the Ku band. This does not require significant changes at the hub ground station 10. The terminal antenna alignment controller 14 might for example be existing hub ground station hardware adapted to include a simple software modification to perform the required measurements and message transmissions. The user ground terminal 20 interprets the measurement in the context of previous measurements to determine if any further antenna adjustment is necessary. This allows for the correction of the antenna alignment to allow for the very Ka narrow beamwidth.

Figure 3:
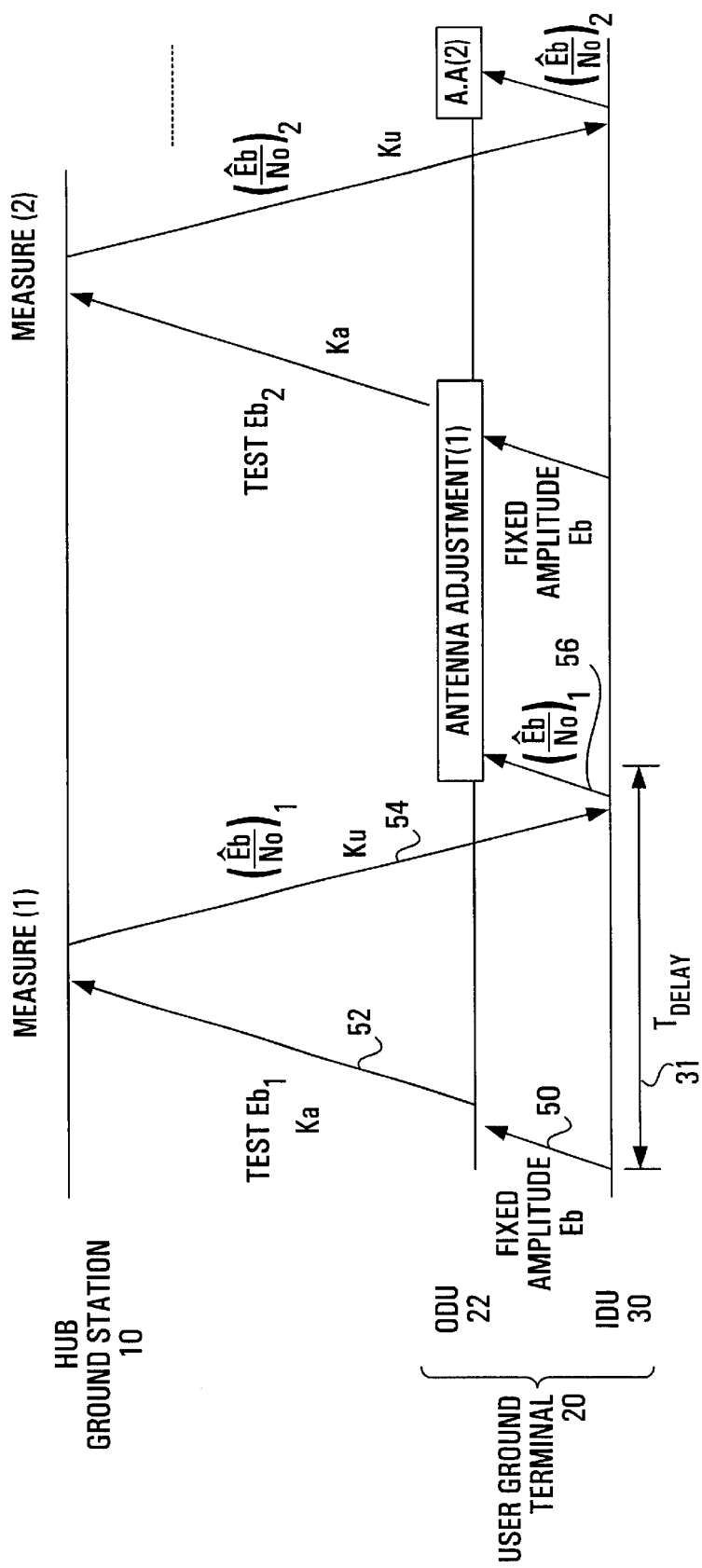
FIG. 3 is an example of a signal flow for an alignment procedure provided by an embodiment of the invention.

FIG. 3 illustrates an example signal flow for the inventive alignment procedure, where signalling between the ODU 22, IDU 30 of the user ground terminal 20, and the hub ground station 10 is shown. To begin, the ground terminal dish antenna 24 is pointed nominally, for example in a direction determined using the conventional reception based pointing technique. Next, the IDU 30 of the user ground terminal 20 generates a signal 50, which has a fixed amplitude during the alignment period and sends this to the ODU 22 which generates and transmits a test signal 52, "$Eb_1$," to the hub ground station 10 on the Ka frequency signal. The hub ground station 10 measures the SNR (Eb/No) of this signal, and sends this back in a message 54, $(\hat{E}b/No)_1$ to the user ground terminal through the Ku frequency signal. Preferably, the alignment procedure is instigated following a terminal log on procedure by sending an initial terminal alignment signal to the hub ground station 10. This signal preferably uses a simple signal pattern, so that it is easily identified and extracted by terminal antenna alignment controller 14. The Eb/No value of this signal will be tested and fed back to the ground terminal 20. The IDU 30 extracts the measurement from the message $(\hat{E}b/No)_1$ and forwards this as a message 56 to the ODU 22 for presentation to the installer. Preferably, searcher functionality is provided in or proximal to the ODU which processes the measurements and interacts with the installer. This is described in detail below. Then the dish antenna 24 direction is changed incrementally in a random direction by the installer (or in a direction based on feedback from the ODU, described below), and the test measurement message sequence is repeated for a second test signal, "$Eb_2$,", resulting in a second measured SNR, $(\hat{E}b/No)_2$, being received by the ground terminal 20. Based on the difference between the second measured SNR and the first measured SNR, a determination is made as to whether the incremental change to the antenna direction resulted in an improvement in the performance or a degradation in the performance and the installer is informed of this result. This process is repeated until an acceptable performance is achieved.

Figure 4:
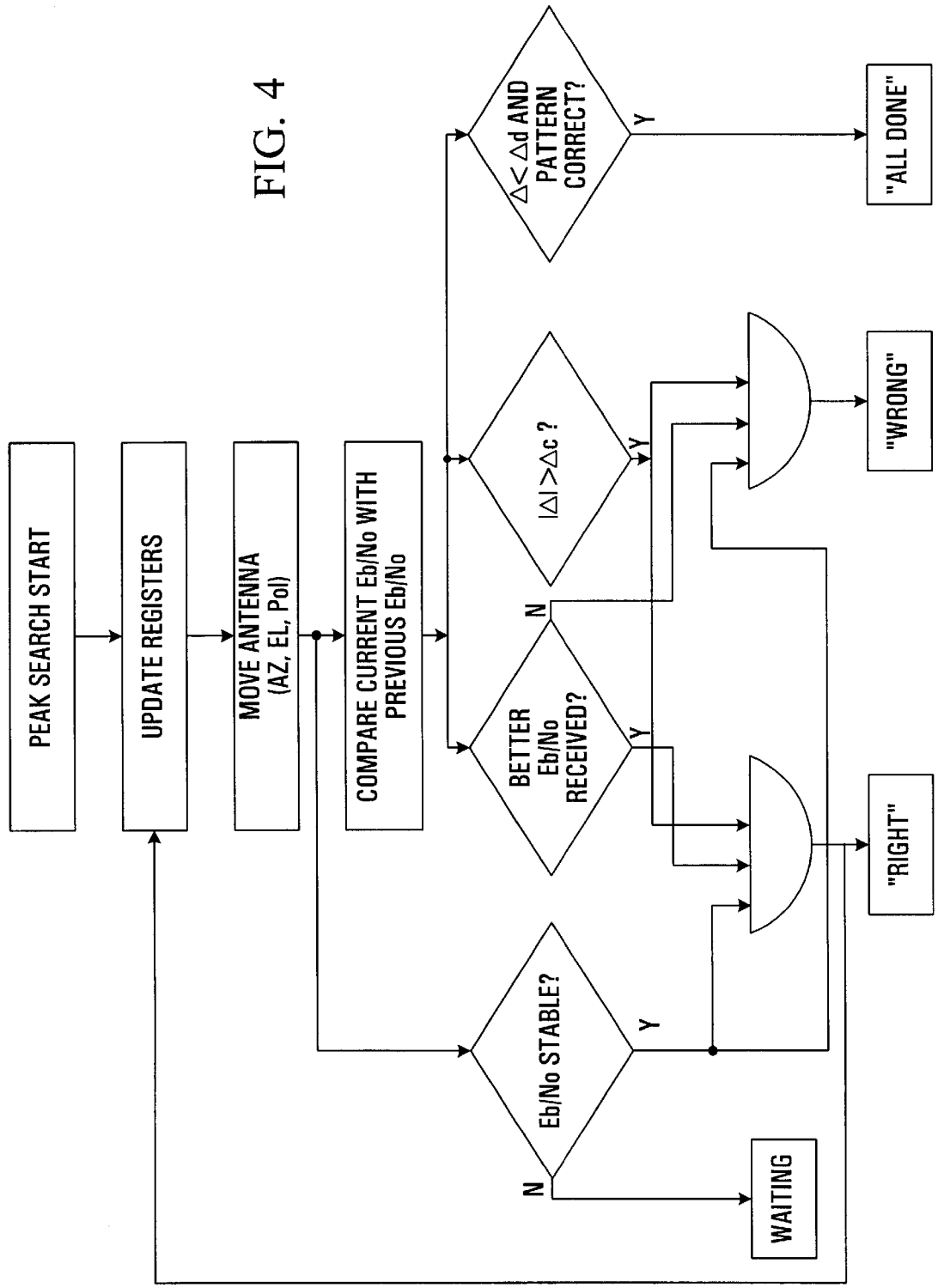
FIG. 4 is a flowchart for a peak search operation procedure which is repeated for each of azimuth, elevation and polarization.

FIG. 4 shows a flowchart for the peak search operation procedure which is repeated for each alignment parameter, namely azimuth, elevation, and polarization if necessary to obtain the best azimuth, elevation and polarization alignment. A detailed example of a circuit which may be used to implement this procedure will be described below. For now, we assume two registers are required, one for the previous Eb/No reading, and the other for the maximum Eb/No achieved since the start of the procedure. At the beginning of the procedure, these two registers are cleared and in subsequent iterations the registers are updated. Next, the dish antenna 24 is moved either to a starting point for the given alignment parameter, be it azimuth, elevation or polarization, or simply to a new test point if it is not the first iteration. A test signal is sent, and the Eb/No is fed back from the hub ground station 10. In a first test, a check is made to see if the Eb/No has become stable. This is to ensure that the Eb/No reading is not still in the process of change. Next, a comparison of the currently received Eb/No with the previous Eb/No is made. Second, third and fourth tests are conducted after this comparison (preferably in parallel as described below for the preferred implementation). In the second test, the new Eb/No is compared to the previous Eb/No to see if it is better. In the third test, the absolute value of the difference $\Delta$ between the new Eb/No reading and the previous Eb/No reading is compared to a threshold $\Delta_c$ to see if the difference is great enough to be attributable to the change in antenna position. In the fourth test, a check is made to see if the maximum Eb/No has been found as defined by one or more criteria.

The results of these four tests are used to select one of four results. The first result is "WAITING" which means that the Eb/No readings are not yet stable. The second result is "RIGHT" meaning that the most recent change in antenna position has resulted in a measurably significant improvement. The third result is "WRONG" meaning that the most recent change in antenna position has resulted in a measurably significant degradation. The fourth result is "ALL DONE" meaning that the procedure is finished for the particular alignment parameter, be it azimuth, elevation or polarization.

The result "WAITING" is achieved in the event that Eb/No is not stable.

The result "RIGHT" is achieved if Eb/No is stable, a better Eb/No has been achieved due to the change in the antenna position, $\Delta$ is greater than $\Delta_c$.

The result "WRONG" is achieved if Eb/No is stable, a better Eb/No has not been received, and $\Delta$ is greater than $\Delta_c$.

The result "ALL DONE" is achieved if the maximum Eb/No is found.

Peak Searcher Realization

Figure 5:
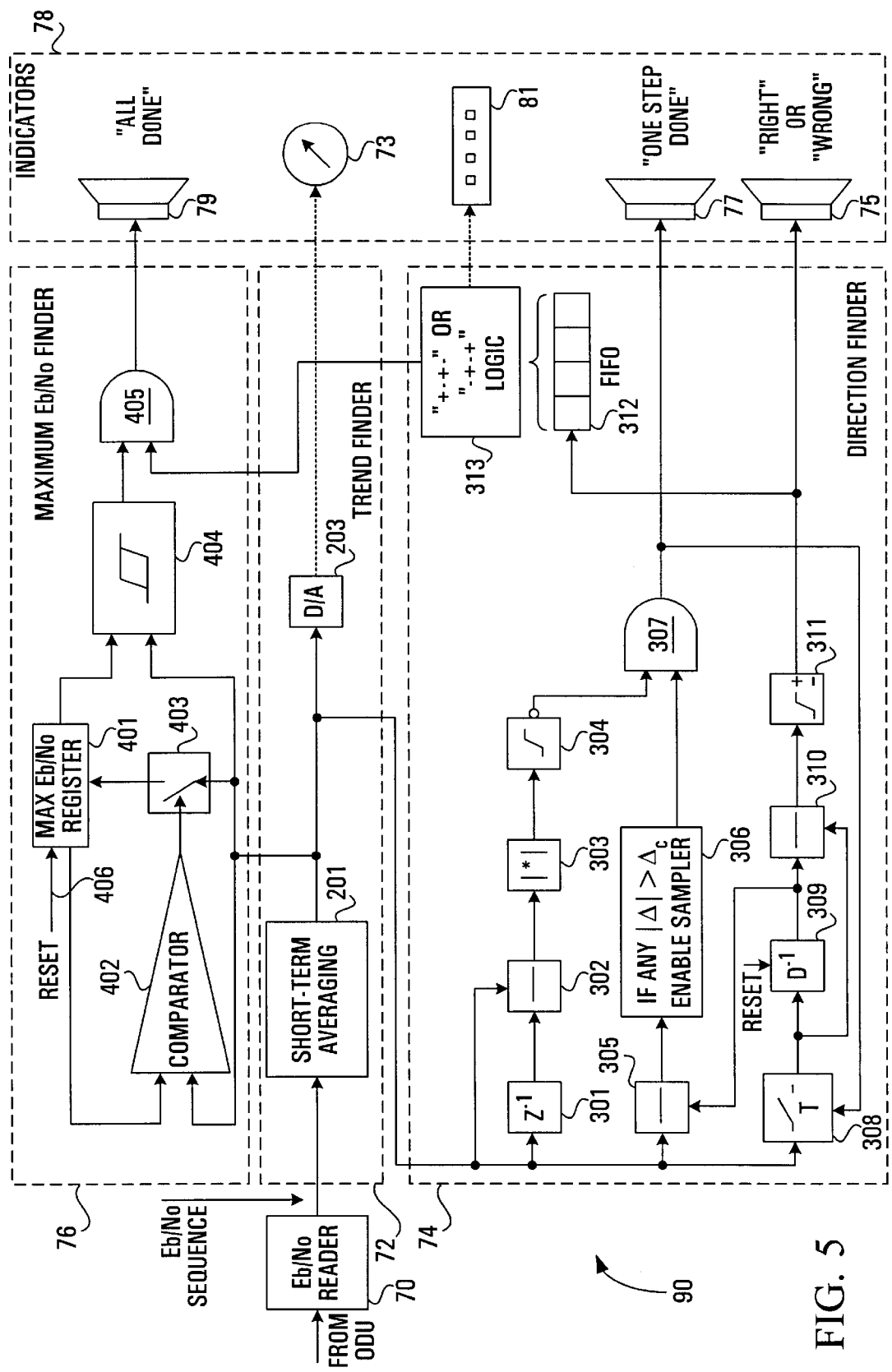
FIG. 5 is a circuit diagram for a preferred embodiment of the peak searcher.

A preferred realization of a peak searcher device/circuitry/functionality enabling the above described alignment method is shown in block diagram form in FIG. 5 generally indicated by 90. The functionality of the peak searcher 90 can be broken down into five groups, namely, an Eb/No reader 70, a trend finder 72, direction finder 74, maximum Eb/No finder 76 and indicators 78. The functionality will be described in detail with reference to FIG. 5 and continued reference to FIG. 1.

It is noted that the measured Eb/No is fed back to the user ground terminal 20 and extracted by the IDU 30. Preferably, the peak searcher 90 is located proximal to or is made a part of the ODU 22 eliminating the need for the installer to run back and fourth between the peak searcher 90 and the ODU 22. However, signal demodulation occurs at the IDU 30. Thus, the fed back values are extracted at the IDU 30 and then send to the peak searcher 90 wherever it may be. The Eb/No reader 70 reads measured Eb/No readings forwarded to the peak searcher 90 from the IDU 30. The output of this device is a sequence of measured Eb/No readings from the hub ground station 10. The interarrival time of the measured Eb/No readings might for example be about 120 ms. The trend finder 72 shows the trend of the measured Eb/No. It reduces the effect of the noise on the measurement accuracy by averaging the Eb/No sequence. The direction finder 74 indicates the finishing of each adjustment step, and shows the results of each adjustment by telling if the adjustment is in the right or wrong direction. The direction finder 74 also retains a recent results pattern. The maximum Eb/No finder 76 traces each parameter's maximum value of Eb/No during the entire adjustment process and determines the completion of the antenna alignment based on the obtained maximum Eb/No and the pattern of the direction finder's recent results pattern. The indicators 90 provide feedback to the installer. Each of these five groups will now be described in further detail.

The trend finder 72 has a short term averaging block 201 connected to receive digital Eb/No readings from the Eb/No reader 70. The short term averaging block 201 is connected to a digital-to-analog converter 203 having an output connected to an indicator in the indicators group 78 such as an analog meter 73. The short term averaging block 201 performs the short-term averaging of the received Eb/No. This eliminates the random changes of the Eb/No due to noise. The D/A converter 203 converts the short term averaged digital sequence of the Eb/No into analog values which are suitable for showing by the meter 73.

The direction finder 74 has a sampler 308, delay register 309, subtractor 310 and threshold device 311 which collectively produce the result of an adjustment step in terms of "RIGHT" "+" or "WRONG" "−". This result is passed to an indicator 75 in the indicator group 78 for the installer.

Sampler 308 takes a value of Eb/No from the sequence of the averaged Eb/No readings from the trend finder 72 at a special sampling time, which will be discussed later. Register 309 is used to retain the last sampled Eb/No. The subtractor 310 produces the difference between the current Eb/No from the sampler 308 and the previous Eb/No stored in the register 309.

Threshold device 311 generates a RIGHT signal "+" or a WRONG signal "−" based on the result produced by the subtractor 310. When the current Eb/No is larger or smaller than the previous one, the threshold device 311 outputs "+" or "−" indicating a right or wrong adjustment direction, respectively.

The direction finder 74 has a subtractor 305 connected to subtract the previous sampled value as output by the delay register 309 from the current Eb/No being produced by the trend finder 72. Change detector 306 is connected to receive the output of the subtractor 305 and to identify when a significant change has occurred in the sequence of the received Eb/No with respect to the previous sampled value stored in delay register 309. If a significant change in the sequence is found, this means that new Eb/No values fed back by the hub are now making their way into the system. Upon detection of such a change, the sampler 308 is enabled "partially" by sending a "1" signal to an AND logic device 307 whose output is connected so as to control the sampler 308. This allows for the fact that the delay, ($T_{delay}$ 31 in FIG. 3) between making the adjustment to the dish antenna position, and the result of this adjustment being fed back from the hub ground station 10, may be unknown. Searching for significant change guarantees that the result produced by the direction finder 74 is valid only after receiving the measured Eb/No due to the current adjustment.

More specifically, the subtractor 305 obtains the differences Δ between stored sampled Eb/No values stored in the delay register 309 and received Eb/No values in the sequence generated by the trend finder 72. If the absolute value of any such difference is greater than a threshold difference, i.e. if any $|\Delta|>\Delta_C$, then an AND logic device 307 is sent a first "1". This partially enables the AND logic device 307, but AND logic device 307 requires a second "1" input described below in order to enable the sampler 308. $\Delta_C$ is a threshold for a significant change. It defines the final accuracy of the antenna alignment. It is usually determined by the hub measurement accuracy. When the sampler 308 is finally enabled, an indicator 77 in the indicators group 78 preferably indicates this to the installer.

The direction finder 74 further includes a delay element 301, subtractor 302, absolute value block 303 and inverted threshold device 304 connected together in sequence. These devices collectively find the time instance when the output of the trend finder 72 is stable, i.e. the time instant that the received Eb/No has stabilized to a "final" value after the most recent adjustment step.

Delay element 301, subtractor 302 and absolute value device 303 produce the absolute variation in the sequence of the received Eb/No. The threshold detector 304 provides a threshold for the stabilization of the Eb/No variation. When the variation is not larger than the threshold, the received Eb/No is considered as the final value after an adjust step. The output of the threshold detector 304 is connected as a second input to the AND logic device 307.

The AND logic device 307 produces a "1" output when its two inputs are true, namely a significant change is detected as determined by the output of change detector 306, and the output of the trend finder 72 is stable. When these inputs are true, sampler 308 is enabled.

The direction finder has a first-in-first-out (FIFO) register 312, which retains the results of the last four adjustments in terms of "RIGHT" "+" or "WRONG" "−" namely the previously referenced "recent results pattern". Preferably, an indicator 81 in the indicators group 78 is provided for indicating to the installer what the four previous adjustments were as output by the threshold device 311.

The direction finder 74 further includes a logic detector 313 which analyzes the contents of the FIFO register 312 searching for contents which indicate stability in the search results. For example, it might be configured to search for contents of the FIFO register 312 equal to "+−+−" or "−+−+". Such contents would indicate that no improvement will result from further shifting of the antenna since its position is just oscillating about a common point. When the logic detector 313 finds one of these particular patterns, it sends signal "1" to the maximum Eb/No finder 76, indicating a first precondition for the identification of a maximum Eb/No has occurred.

The maximum Eb/No finder 76 has a maximum Eb/No register 401 used to retain the maximum value received in the Eb/No sequence during the entire antenna adjustment process for an alignment parameter. A reset input 406 is provided to clear this register, and this is done at the start of the alignment procedure in each alignment parameter. A comparator 402 is connected to receive received Eb/No readings from the short term averaging block 201 and the value retained in the maximum Eb/No register 401. It compares each received Eb/No with the value retained in the maximum Eb/No register 401. If a received Eb/No is larger than that value, the comparator 402 sends the signal to a switch 403.

Switch 403 is connected to receive the output of the comparator 402 and to control the overwriting of the contents of the maximum Eb/No register 401 with the most recent Eb/No reading. Upon receiving a signal from the comparator 402, the switch 403 is closed such that the value in the maximum Eb/No register 401 is updated by the current Eb/No.

A range detector 404 is provided which detects whether the current Eb/No received from the Eb/No reader 70 is within a range $\Delta_d$ around the maximum value stored in the max Eb/No register 401. It generates a true output when this is the case and passes this as an input to an AND logic device 405. AND logic device 405 has a second input consisting of the result from the logic detector 313. AND logic device 405 thus generates a true output when the recent results pattern from the direction finder is "+−+−" or "−+−+" and the current Eb/No is within a small range of the maximum Eb/No received ever. AND logic device 405 drives an indicator 79 in the indicators group 78, and signals to the installer "ALL DONE" when both its inputs are true.

Indicators Group

The illustrated embodiment includes the indicators group 78 having an indicator 79 for indicating when the antenna is aligned for a particular parameter to the extent possible using the device and method, an indicator 73 for providing trend information relating to Eb/No readings, an indicator 81 for providing a recent results patterns, an indicator 77 for indicating whether an adjustment step has been completed or not, and an indicator 75 for indicating whether an adjustment step is right or wrong. Any suitable indicators may be used to achieve these indicating functions. For example, labeled LEDs, an audio speaker, and various types of meters etc. The indicators do not need to be separate devices, and not all the indicators are necessary in every embodiment. For example, in the event an audio speaker is used, the same speaker could be of course used for any audio indication events.

Alignment Procedure

Figure 6:
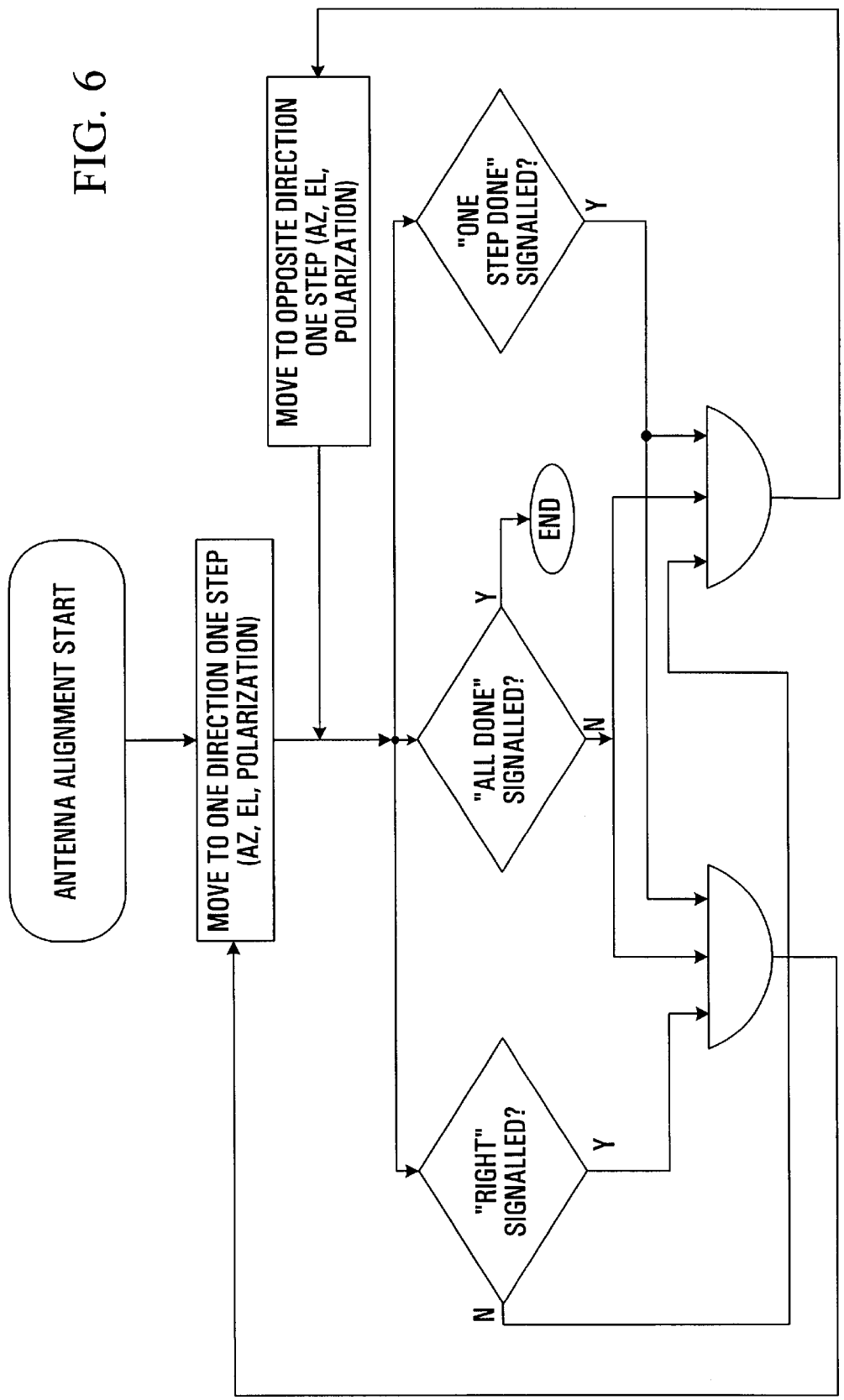
FIG. 6 is a flowchart of steps performed by an operator in using the peak searcher tool of FIG. 5.

The steps executed by an installer in using the above described apparatus are summarized in the flowchart of FIG. 6. The actions of the installer are coordinated with the generation of the RIGHT, WRONG, ALL DONE, and ONE STEP DONE signals sent through the above discussed indicators. Depending on these four signals, the installer either knows that the installation is complete (for azimuth, elevation or polarization), that the antenna should be moved in a step in the same direction, or that the antenna should be moved a step in the opposite direction.

More specifically, if RIGHT is signalled, ALL DONE is not signalled, and ONE STEP DONE is signalled, then the installer should move the antenna another step in the same direction. If RIGHT is not signalled, ALL DONE is not signalled, and ONE STEP DONE is signalled, then the installer should move the antenna one step in the opposite direction. If ALL DONE is signalled, then the procedure for the given alignment variable (azimuth, elevation or polarization) is complete. There are a number of procedural improvements which can be employed. In one embodiment, the antenna is aligned for in sequence for all alignment variables using a large step size. Then, the alignment procedure is repeated in sequence for each alignment using a smaller step size to refine the alignment. In another embodiment, the alignment procedure is completed for a given alignment variable using a large step size, then the procedure is restarted for the same alignment variable using a smaller step size. Alternatively, the smallest step size may be used from the beginning. In any case, preferably adjustments are continued until a maximum is found using the smallest adjustments possible.

Figure 7:
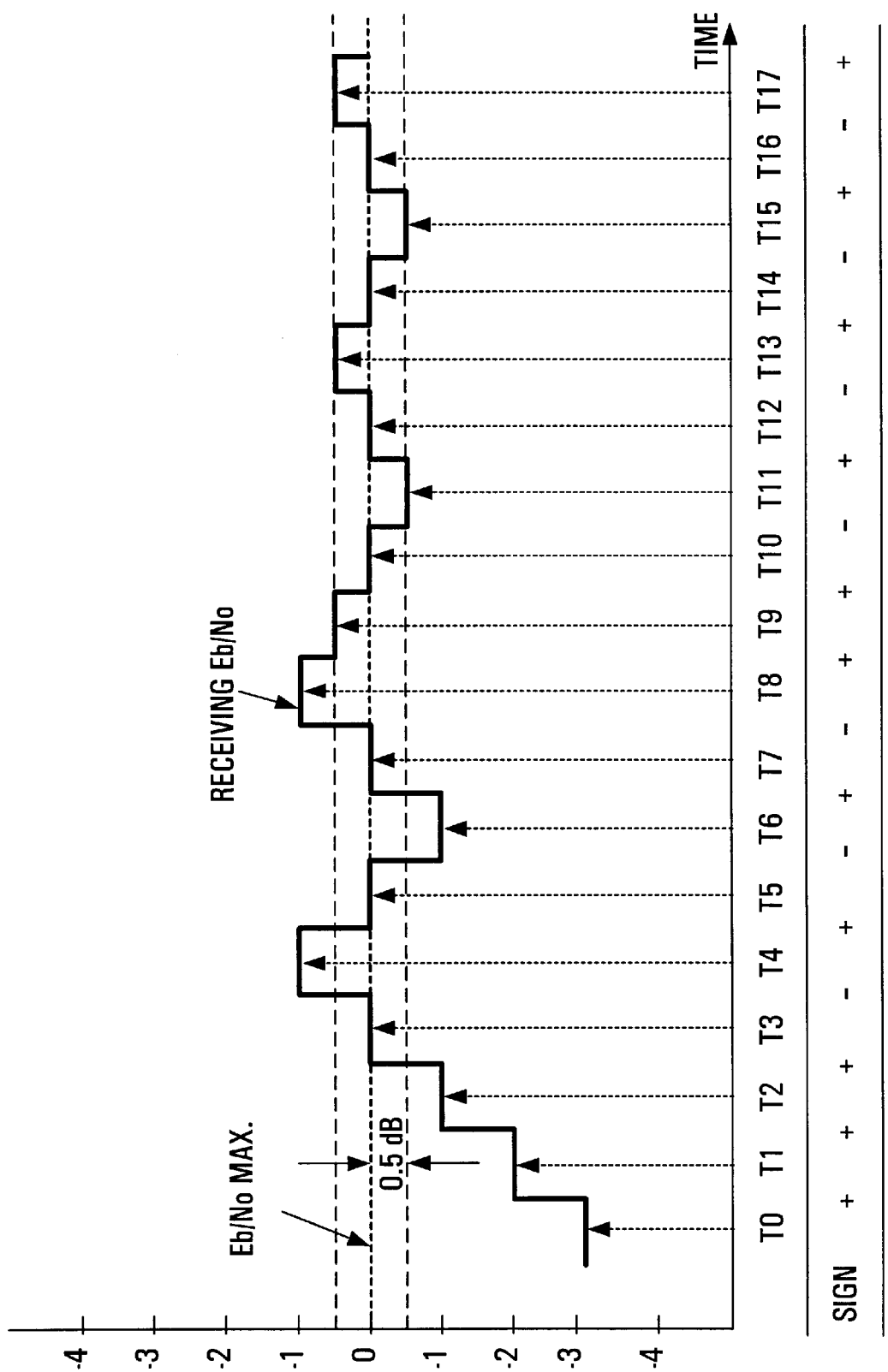
FIG. 7 is an example plot of pointing loss which may occur using the method provided by an embodiment of the invention.

An example of a possible antenna alignment progression is shown in FIG. 7. Initially, the Eb/No fed back after the first step is –3 dB. It improves in increments of 1 dB (by way of example only) for three steps and then in the fourth step overshoots the maximum to result in a degradation in performance with respect to the maximum. This results in the installer being instructed to reverse the previous adjustment. This is done, and in fact the best result is again overshot.

At point "X", the procedure will be complete in the sense that the maximum will have been found, and the recent results pattern is "+−+−". At this point, the tool is reset, and the installer starts using a smaller step size to get an even more accurate antenna alignment. In this example, in the interest of expediting the procedure, the installer has chosen a large step size initially to approach the max point quickly, and changes to a small step size to improve the resolution and accuracy of the alignment. Alternatively, the installer could use a small step right from the beginning. Preferably, the procedure is repeated until the smallest possible step size is being used, thereby ensuring the best possible alignment has been achieved.

Figure 8A:
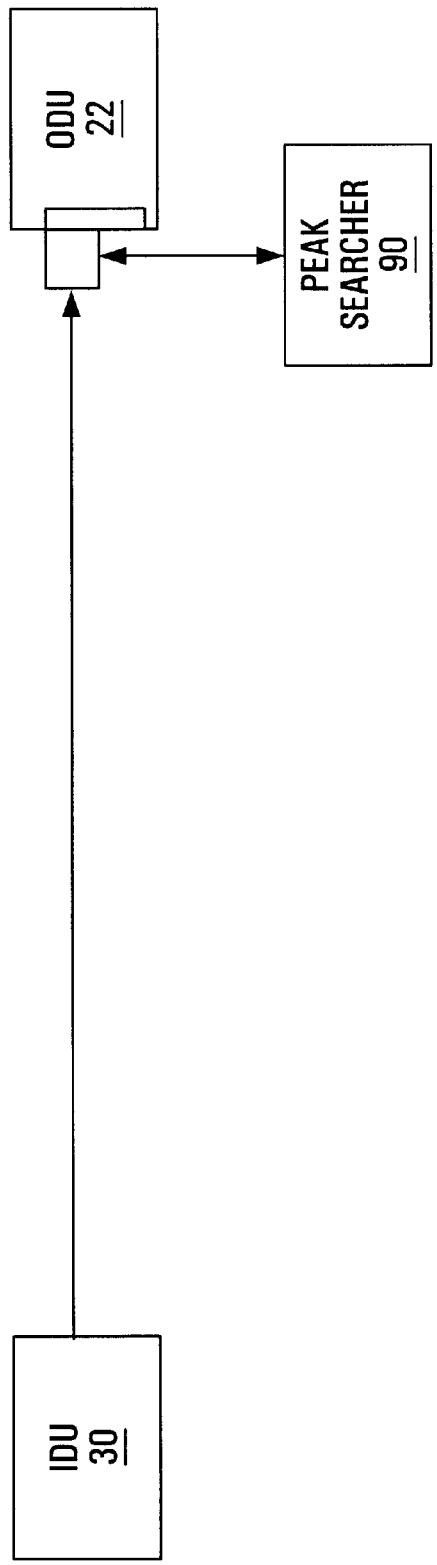
FIGS. 8A and 8B illustrate two potential locations for the peak searcher tool provided by an embodiment of the invention.
Figure 8B:
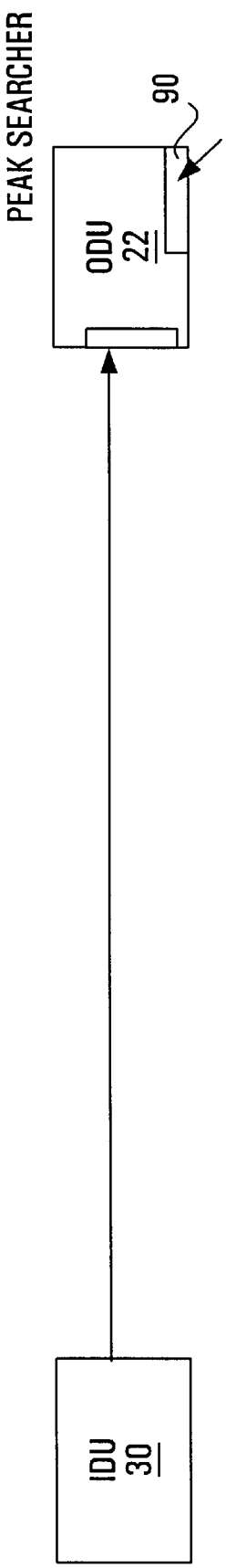

Referring to FIG. 8A, the peak searcher 90 may be implemented as a separate device which can be attached to the ODU 22. Alternatively, as shown in FIG. 8B, the peak searcher 90 may be built into the ODU 22.

Figure 9:
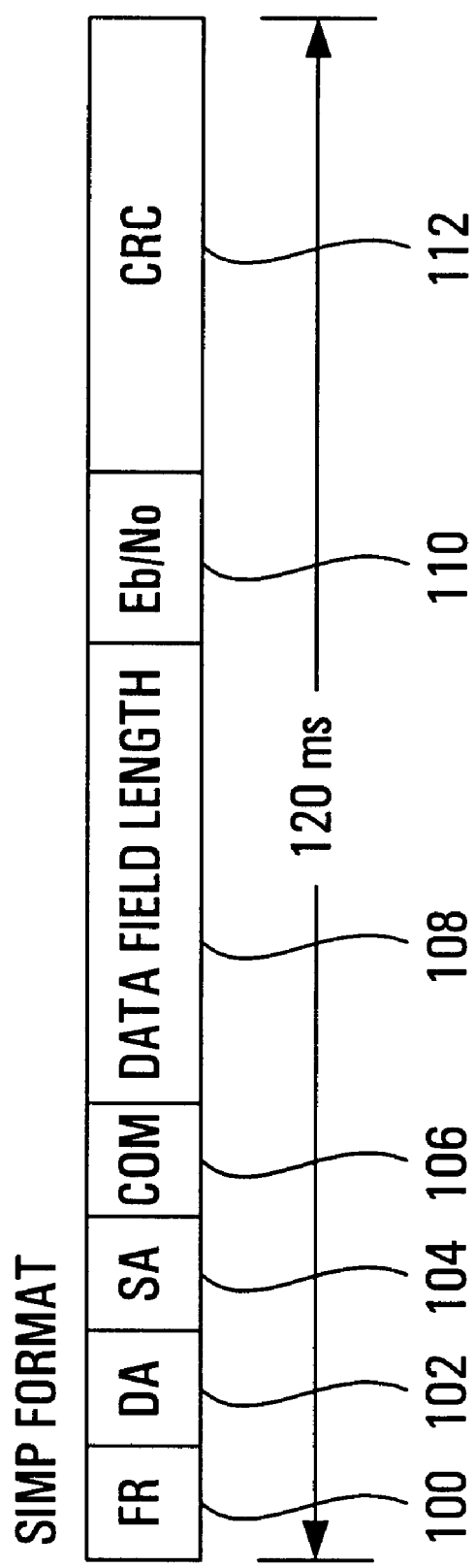
FIG. 9 is an example of modifications to the SIMP format which may be used in accordance with an embodiment of the invention.

Preferably, when the IDU 30 extracts the Eb/No data, it inserts it into the SIMP format (see for example EUTELSAT, BUS FUNCTION SPECIFICATION, VERSION 4.2, Feb. 25, 1998) for forwarding to the ODU 22. An example of how this Eb/No data may be embedded in the SIMP format is shown in FIG. 9. The SIMP format is shown to include FR (framing) 100, DA (Destination Address) 102, SA (Source Address) 104, COM (Command) 106, Data field length 108, Data (Eb/No) 110, and CRC fields 112. The length of the DATA segment 110 is from 0 to 3 bytes. Only one byte is needed for the Eb/No readings, so no change to the SIMP format is required to accommodate it. In the event that this SIMP format is used, the Eb/No reader (70 in FIG. 5) can be a SIMP decoder which is a readily available component.

In the illustrated and described embodiments, the information fed back from the hub consists of a stream of Eb/No measurements. More generally, any suitable alignment accuracy indications may be fed back from the hub antenna, Eb/No measurements being just one example. Another example of suitable alignment accuracy indications is the absolute signal strength of the terminal signal.

Numerous modifications and variations of the present invention are possible in light of the above teachings. It is therefore to be understood that within the scope of the appended claims, the invention may be practised otherwise than as specifically described herein.

In the illustrated embodiments, the maximum Eb/No finder, the trend finder, and the direction finder are shown as separate components each respectively comprised of a number of circuit components or functional blocks. It is to be understood that any or all of these circuit components/ functional blocks may be realized using any suitable functional medium, for example in hardware, firmware, or in software running on a suitable processor, or in any combination of different functional mediums.

In the illustrated embodiments the measurements are sent over the downlink. In another embodiment, the measurements are fed back to the user ground terminal using some other signalling channel, such as a telephone link.

The illustrated embodiments have focussed on aligning a user ground terminal's dish antenna to a satellite. More generally, an embodiment of the invention provides for systems and methods for aligning a transmit antenna with a remote receiver. The method does not change because a different remote antenna is involved. Broadly, this embodiment simply consists of transmitting from the antenna a test signal over a transmit channel to the remote receiver, receiving a sequence of alignment accuracy indications for the test signal, and making a plurality of adjustments to the antenna's orientation for the alignment parameter on the basis of the sequence of alignment accuracy indications.

what is claimed is:

1. A method of aligning a ground-based antenna with a satellite according to an alignment parameter comprising:

transmitting from the ground-based antenna a test signal over an uplink channel to the satellite;

receiving at the ground-based antenna over a downlink channel from the satellite a sequence of alignment accuracy indications for the test signal; and making a plurality of adjustments to the antenna's orientation for the alignment parameter on the basis of the sequence of alignment accuracy indications.

2. A method according to claim 1 further comprising:

processing alignment accuracy indications to give an indication of whether a previous adjustment resulted in an improvement or a degradation in pointing accuracy.

3. A method according to claim 2 wherein processing alignment accuracy indications comprises:

determining if the received alignment accuracy indications have become stable;

detecting if a non-trivial change in the quality since the adjustment has occurred;

detecting if there is an improvement in the received alignment accuracy indications;

determining if a maximum alignment accuracy indication has been received;

wherein if the received alignment accuracy indications have become stable, a non-trivial change has been detected, an improvement in the received alignment accuracy indications has been detected, an indication is output indicating that the previous adjustment was a good one; and wherein if the received alignment accuracy indications have become stable, a non-trivial change has been detected, an improvement in the received alignment accuracy indications has not been detected, an indication is output indicating that the previous adjustment was a bad one;

wherein if the received alignment accuracy indications have become stable, and the maximum alignment accuracy indication has been received, an indication is output indicating that the method for the parameter is complete.

4. A method according to claim 2 further comprising generating a "right" or "wrong" indication after the adjustment to the antenna orientation, wherein "right" indicates that the previous adjustment resulted in an improvement in pointing accuracy and that another adjustment in the same direction should be made, and "wrong" indicates that the previous adjustment resulted in a degradation in pointing accuracy and that an adjustment in the opposite direction should be made.

5. A method according to claim 4 further comprising storing a sequence of said "right" and "wrong" indications, wherein a maximum is detected on the basis of the sequence of "right" and "wrong" indications.

6. A method according to claim 1 wherein the uplink signals are sent from the antenna to a satellite which retransmits them to a hub ground station which generates said alignment accuracy indications and transmits these to the satellite which retransmits them to the antenna.

7. A method according to claim 1 wherein the alignment accuracy indication is a measure of signal-to-noise ratio.

8. A method according to claim 1 wherein an optimal alignment is detected by:

determining when a sequence of said adjustments have been made which resulted in an oscillation in the antenna's orientation about a common position.

9. A method according to claim 1 further comprising making the plurality of adjustments using a first stepsize until a best possible alignment using that stepsize until a best possible alignment using that stepsize has been achieved and then repeating the entire method using a smaller stepsize.

10. A method according to claim 1 further comprising repeating the steps of transmitting, receiving and making a plurality of adjustments for each of a plurality of alignment parameters in sequence using a large stepsize, and then repeating the steps of transmitting, receiving and making a plurality of adjustments for each of the plurality of alignment parameters using a smaller stepsize.

11. A method according to claim 1 wherein the alignment accuracy indications are received through the antenna.

12. A peak searcher apparatus adapted to facilitate aligning an antenna with a remote receiver according to an alignment parameter by co-ordinating antenna adjustment steps made by an installer, the apparatus comprising:

an input adapted to receive a sequence of alignment accuracy indications each indicative of alignment accuracy;

an optimal alignment accuracy indication finder functional entity adapted to identify when a best alignment accuracy indication has been received in said sequence of alignment accuracy indications;

a direction finder functional entity adapted to make a determination from said sequence of alignment accuracy indications whether a most recent adjustment step made by the installer has resulted in an improvement or degradation;

an indicator adapted to indicate to said installer the determination made by the direction finder functional entity.

13. A peak searcher apparatus according to claim 12 adapted for use with a ground terminal which generates a test signal, transmits the test signal through a satellite to a remote receiver, receives alignment accuracy indications made by the remote receiver on the basis of the test signal, and passes these alignment accuracy indications to the peak searcher apparatus.

14. A peak searcher apparatus according to claim 13 in combination with a ground terminal which generates a test signal, transmits the test signal to a remote receiver, receives alignment accuracy indications made by the remote receiver on the basis of the test signal, and passes these alignment accuracy indications to the peak searcher apparatus.

15. A peak searcher apparatus according to claim 13 wherein said alignment accuracy indications are signal-to-noise ratio (Eb/No) measurements.

16. A peak searcher apparatus according to claim 13 wherein said direction finder functional entity is further operable to identify predetermined patterns in a most recent sequence of said determinations which are defined to indicate no further adjustments are required.

17. A peak searcher apparatus according to claim 16 wherein said direction finder functional entity comprises a memory for storing the most recent sequence of said determinations, and logic for identifying said predetermined patterns.

18. A peak searcher apparatus according to claim 16 wherein said predetermined patterns comprise alternating improvements and degradations.

19. A peak searcher apparatus according to claim 16 wherein said maximum alignment accuracy indication finder functional entity comprises a memory for storing a maximum alignment accuracy indication received so far, and wherein the maximum alignment accuracy indication finder functional entity is adapted to indicate the best alignment accuracy indication has been received only when one of said predetermined patterns has been found, and the most recent alignment accuracy indication is substantially equal to the maximum alignment accuracy indication.

20. A peak searcher apparatus according to claim 12 further comprising:

a sampling functional entity for taking samples of the alignment accuracy indications at particular sampling instants, and a sampler control functional entity for determining said sampling instants;

wherein the direction finder functional entity makes one of said determinations after each sample is taken.

21. A peak searcher apparatus according to claim 20 wherein said sampler control functional entity is operable to identify when the alignment accuracy indications have become stable and to identify when a significant change in the alignment accuracy indications since the previous sample has occurred, and to enable the sampler when both the alignment accuracy indications have become stable and a significant change has occurred.

22. A peak searcher apparatus according to claim 12 further comprising an indicator for indicating trends in the alignment accuracy indications.

23. A peak searcher apparatus according to claim 12 further comprising an indicator for indicating the results of recent adjustment steps.

24. A peak searcher apparatus according co claim 12 wherein said alignment accuracy indications are passed from the receiver to the peak searcher apparatus in satellite image messaging protocol (SIMP) messages, the peak searcher apparatus further comprising a SIMP decoder for extracting the alignment accuracy indications from the SIMP messages.

* * * * *